(12) United States Patent
Nakasuga et al.

(10) Patent No.: US 7,871,950 B2
(45) Date of Patent: Jan. 18, 2011

(54) COLORED ZIRCONIA-BASED SINTERED BODY AND MANUFACTURING METHOD THEREOF AND DECORATIVE MEMBER

(75) Inventors: Minoru Nakasuga, Satsumasendai (JP); Hideo Kimura, Osaka (JP)

(73) Assignees: Kyocera Corporation, Kyoto (JP); Daiichi Kigenso Kagaku Kogyo Co., Ltd., Osaka (JP)

( * ) Notice: Subject to any disclaimer, the term of this patent is extended or adjusted under 35 U.S.C. 154(b) by 388 days.

(21) Appl. No.: 12/089,879

(22) PCT Filed: Mar. 16, 2007

(86) PCT No.: PCT/JP2007/055404

§ 371 (c)(1),
(2), (4) Date: Apr. 10, 2008

(87) PCT Pub. No.: WO2007/108416

PCT Pub. Date: Sep. 27, 2007

(65) Prior Publication Data

US 2010/0240519 A1 Sep. 23, 2010

(30) Foreign Application Priority Data

Mar. 20, 2006 (JP) .......................... 2006-076550

(51) Int. Cl.
*C04B 35/48* (2006.01)

(52) U.S. Cl. .................................................. 501/105

(58) Field of Classification Search ................ 501/103, 501/104, 105
See application file for complete search history.

(56) References Cited

U.S. PATENT DOCUMENTS

| 4,757,036 A | 7/1988 | Kaar et al. ................ 501/95 |
| 5,352,638 A * | 10/1994 | Beall et al. ................ 501/10 |
| 5,482,907 A * | 1/1996 | Tuan et al. ................ 501/120 |

FOREIGN PATENT DOCUMENTS

| EP | 0 227 374 A2 | 7/1987 |
| EP | 0227374 A2 | 7/1987 |
| JP | 590105055 A | 6/1984 |
| JP | 59-174574 | 10/1984 |
| JP | 62-108779 | 5/1987 |
| JP | 62143863 A | 6/1987 |
| JP | 64-079067 | 3/1989 |
| JP | 01-157462 | 6/1989 |
| JP | 02-038363 | 2/1990 |
| JP | 10-081562 | 3/1998 |
| JP | 2821680 B | 9/1998 |

* cited by examiner

*Primary Examiner*—Karl E Group
(74) *Attorney, Agent, or Firm*—DLA Piper LLP (US)

(57) ABSTRACT

This invention provides a colored zirconia-based sintered body, mainly composed of zirconia containing a stabilizer, which contains alumina and nickel spinel, and has a novel color tone, and a method for manufacturing such a zirconia-based sintered body. The colored zirconia-based sintered body is applicable not only to a highly decorative product such as a watch, but also to knives, tweezers, machining jigs and holding jigs for electronic parts, and sliding members.

3 Claims, 1 Drawing Sheet

COLORED ZIRCONIA-BASED SINTERED BODY AND MANUFACTURING METHOD THEREOF AND DECORATIVE MEMBER

CROSS-REFERENCE TO THE RELATED APPLICATIONS

This application is a national stage of international application No. PCT/JP2007/055404 filed Mar. 16, 2007, which also claims benefit of priority under 35 U.S.C. §119 to Japanese Patent Application No. 2006-076550 filed Mar. 20, 2006, the entire contents of which are incorporated by reference.

TECHNICAL FIELD

This invention relates to a colored zirconia-based sintered body and a manufacturing method thereof, and to a decorative member using such a sintered body, such as a watch case and an accessory.

BACKGROUND ART

A zirconia-based sintered body, that is, in particular, a tetragonal-system zirconia-based sintered body, has been applied to household articles, such as edged tools, and sports goods, such as spikes for golf shoes, because of its high strength and superior surface gloss after mirror polishing, and its applications have been expanded to decorative members, such as watch cases and accessories, high-grade building materials, mechanical members, such as various structural members, and ceramics electronic members, such as substrates and the like, of electronic parts. In order to respond to these expanding applications, there have been strong demands for colored zirconia having various colors other than conventionally-known black color.

For example, JP-A No. 62-108779 has proposed a blue-color ceramic decorative member produced by adding cobalt oxide to partially-stabilized zirconia. Here, JP-B No. 8-18868 has proposed a colored zirconia-based sintered body with high strength having a blue color, which is formed by adding $Fe_3O_4$ and $TiO_2$ to yttria-stabilized zirconia. Moreover, U.S. Pat. No. 2,821,680 has proposed a blue-colored zirconia-based sintered body formed by adding $Al_2O_3$ and CoO to stabilized zirconia. Furthermore, JP-A No. 59-105055 has proposed a zirconia-based colored member having a light green color, which is formed by adding NiO to yttria- or calcia-stabilized zirconia. U.S. Pat. No. 2,645,443 has proposed a zirconia-based sintered body having a yellow color, which is formed by adding $Al_2O_3$ and NiO to yttria-stabilized zirconia. JP-A No. 59-174574 has proposed a partially stabilized zirconia-based sintered body, which contains alumina particles formed by solid-saluting an oxide of at least one kind of transition metal selected from Mn, Ti, Fe, V, Co, Cr and Ni, in a dispersed state, and has reported that the application of CoO produces a blue color, the application of $Cr_2O_3$ produces a light red color and the application of MnO produces a brown color.

DISCLOSURE OF INVENTION

In the case of highly decorative products such as watches, black color and those colors close to black are preferred because high-quality tastes are exerted by those colors; in contrast, in recent years, there have been strong demands for colored zirconia having novel color tones of light-bluish colors. At present, however, a technique that satisfies these demands has not been developed.

Therefore, the objective of the present invention is to provide a zirconia-based sintered body having a novel color tone of a light bluish color, and a method for manufacturing such a sintered body.

In order to achieve the above-mentioned objective, the inventors, etc. of the present invention have studied hard extensively, and have found that unexpectedly, a colorant preliminarily prepared by firing nickel oxide and alumina is applicable, and when this is mixed and sintered with zirconia containing a stabilizer, a zirconia-based sintered body having a novel color tone of a light bluish color is obtained; thus, the present invention has been completed.

That is, a colored zirconia-based sintered body in accordance with the present invention is mainly composed of zirconia containing a stabilizer, with alumina and nickel spinel contained therein.

Here, nickel spinel ($NiAl_2O_4$, hereinafter, referred to simply as "nickel spinel"), contained in the sintered body of the present invention, functions as a colorant that allows color development in a light blue color. Even when each of alumina and nickel oxide is alone added to zirconia, it is not possible to obtain a zirconia-based sintered body having a color tone like that of the sintered body of the present invention. In contrast, the sintered body of the present invention, which is obtained by adding to zirconia a colorant that has been prepared by preliminarily allowing alumina and nickel oxide to react with each other, exhibits a beautiful light blue color, which makes the present invention different from the conventional method.

In the colored zirconia-based sintered body of the present invention, the content of the alumina is set in a range from 1 to 40% by mass, and the content of nickel spinal is preferably set in a range from 0.01 to 10% by mass.

Moreover, color difference ($L^*$, $a^*$, $b^*$) is preferably set so that $L^*=50$ to 90, $a^*=-14$ to $-9$ and $b^*=-15$ to $-1$.

Here, the color difference ($L^*$, $a^*$, $b^*$) of the present invention refers to values obtained by a color-difference colorimeter (Model CR-221, made by Konica Minolta Holdings, Inc.), which are measured on the following items, and indicated as numeric values.

$L^*$: Lightness which varies from 0 to 100 (100: white, 0: black)

$a^*$: Positive values represent degree of red color, 0 represents gray, and negative values represent degree of green color.

$b^*$: Positive values represent degree of yellow color, 0 represents gray, and negative values represent degree of blue color.

The colored zirconia-based sintered body of the present invention is, for example, manufactured by using the following method: that is, the method for manufacturing the colored zirconia-based sintered body of the present invention includes processes of (1) preparing zirconia containing a stabilizer, and (2) mixing the zirconia with a colorant formed by firing at least one kind of nickel oxide material selected from nickel oxide and its precursors and at least one kind of alumina material selected from alumina and its precursors, and sintering the resulting mixture.

Moreover, the content of the colorant is preferably set in a range from 0.01 to 10% by mass, with the ratio of alumina/nickel oxide (mole fraction) being set to 0.5 or more.

Here, a decorative member may be manufactured by using the colored zirconia-based sintered body of the present invention. That is, the decorative member of the present invention is formed by using a zirconia-based sintered body having a light blue color, which is mainly composed of zirconia containing a stabilizer, with alumina and nickel spinel contained therein. With respect to the zirconia-based sintered body, those in which the content of alumina is set in a range from 1 to 40% by mass and the content of nickel spinel is set in a range from 0.01 to 10% by mass relative to the entire sintered body may be used. Moreover, those which have the color difference (L*, a*, b*) of the zirconia-based sintered body in ranges of L*=50 to 90, a*=−14 to −9 and b*=−15 to −1 may be used.

The present invention makes it possible to provide a zirconia-based sintered body having a color tone of a novel light-bluish color. The zirconia-based sintered body of this kind can be desirably applied not only to highly decorative products such as watches, but also to kitchen knives, to tweezers to machining jigs and holding jigs for electronic parts, as well as to sliding members. In particular, upon application as a machining jig or a holding jig, the zirconia-based sintered body provides clear contrast when an electronic part having a dark color tone is set therewith, and makes it possible to alleviate fatigue in vision due to reflected light from illumination; therefore, the visibility of the worker is improved, and the working efficiency is effectively improved.

REFERENCE NUMERALS

Figure 1:
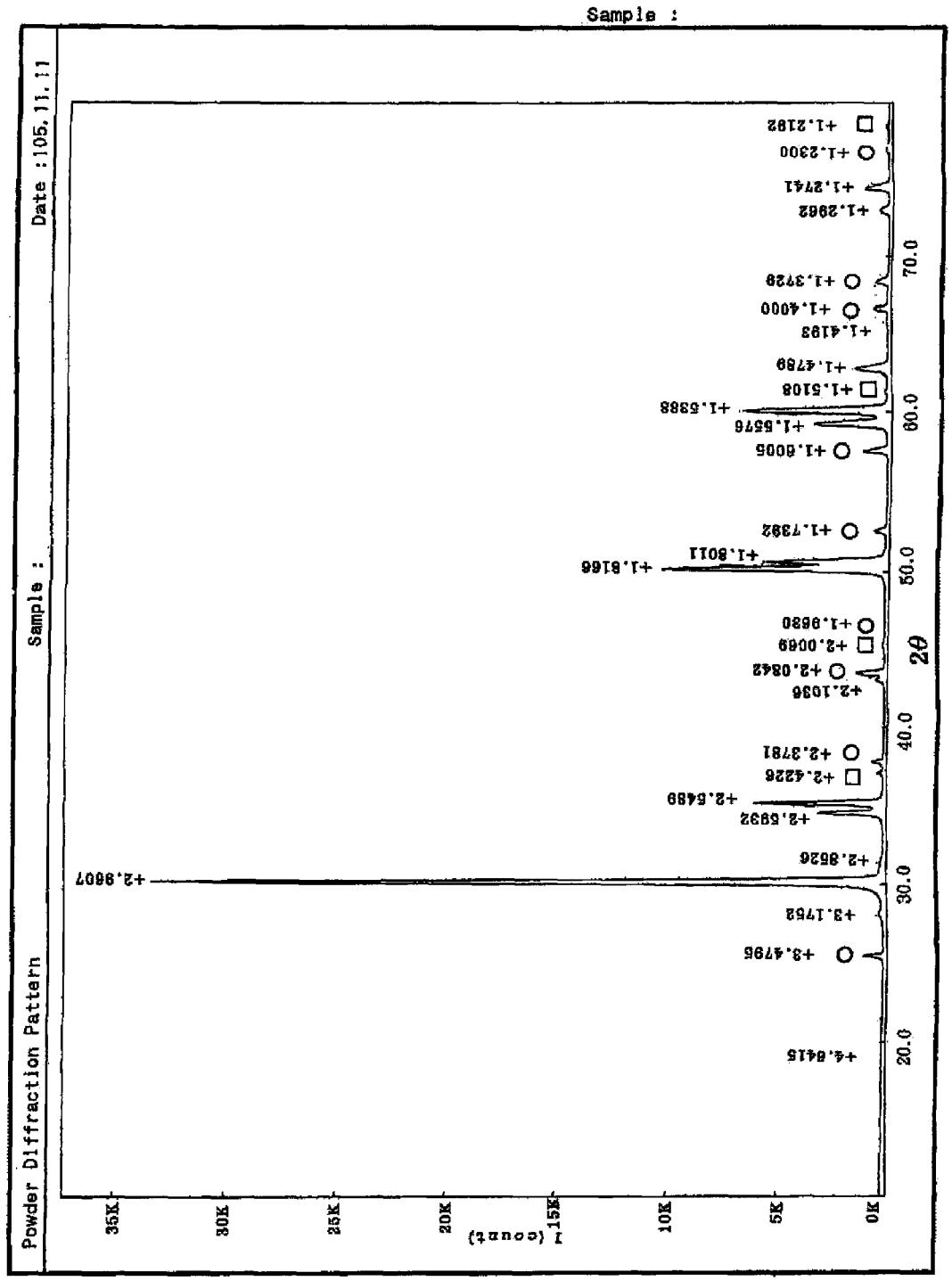
FIG. 1 is a drawing that shows an X-ray diffraction analysis chart on the surface of a sintered body of Sample No. 17 in accordance with Example 2 of the present invention.

◯: Alumina ($Al_2O_3$)
☐: Nickel spinel ($NiAl_2O_4$)

BEST MODE FOR CARRYING OUT THE INVENTION

The following description will discuss Embodiments of the present invention in detail.

The colored zirconia-based sintered body of the present invention is mainly composed of zirconia containing a stabilizer, with alumina and nickel spinel contained therein.

The zirconia containing a stabilizer is formed by allowing zirconia ($ZrO_2$) to preliminarily contain at least one kind of stabilizer such as $Y_2O_3$, $CeO_2$, CaO and MgO. Although not particularly limited, the content of this stabilizer is preferably set to 1 to 6 mol % for $Y_2O_3$, to 6 to 10 mol % for $CeO_2$ and to 6 to 12 mol % for CaO and MgO, in the partially stabilized zirconia composition. Thus, it becomes possible to obtain a sintered body having high strength and toughness. The zirconia-based sintered body preferably has an average crystal grain size of 2 μm or less. Thus, the strength of the sintered body is properly maintained, crystal grains are made to hardly come off upon processing, and a superior mirror face is obtained.

The alumina has such effects that it becomes possible to freely control the color tone of light blue colors, in particular, the lightness. The content of alumina is preferably set in a range from 0.1 to 50% by mass, more preferably, from 1 to 40% by mass with respect to the entire sintered body. The content exceeding 0.1% by mass causes a reduction in the light transmitting property that is peculiar to zirconia, and a subsequent rise in the lightness. The content of 50% by mass or less makes the alumina crystal grains having low toughness less vulnerable to surface defects such as coming off of grains due to impact applied thereon at the time of processing during a mirror polishing process on the sintered body. Moreover, the content of 1% by mass or more makes it possible to provide high reproducibility in color tone of the sintered body even when different manufacturing batches of the material and furnaces are used, and the content of 40% by mass or less makes it possible to suppress the growth of alumina grains, and consequently to increase the strength of the sintered body and reduce cracks occurring on corner portions of the product.

Moreover, the content of alumina of less than 0.1% by mass causes an insufficient scattering effect of light by the alumina crystal grains and the subsequent failure in reducing the light transmitting property of zirconia to cause a reduction in lightness, making it difficult to obtain a vivid light blue color; in contrast, the content exceeding 50% by mass causes a reduction in the strength of the sintered body, making it difficult to obtain a superior mirror face that is less vulnerable to coming off of grains even when a mirror polishing process is carried out on curved faces by using a barrel or the like.

Furthermore, the average crystal grain size of alumina in the sintered body is preferably set to 3 μm or less. Thus, it becomes possible to obtain a superior mirror face free from coming off of grains upon carrying out a mirror polishing process on the sintered body.

The content of nickel spinel is preferably set in a range from 0.01 to 10% by mass with respect to the entire sintered body. Preferably, the content is set in a range from 1 to 4.8% by mass. The content of 0.01% by mass or more makes it clear that the zirconia-based sintered body has a light blue color to provide a superior decorative property, and the content of 10% by mass or less prevents a reduction in the sintering density due to a colorant to properly maintain the mechanical strength. Moreover, the content of 1% by mass or more makes it possible to provide high reproducibility in color tone of the sintered body even when different manufacturing batches of the material and furnaces are used, and the content of 4.8% by mass or less makes it possible to further reduce the colorant so that the mechanical strength is properly maintained and it becomes possible to desirably reduce chipping from occurring even upon carrying out a machining process such as a grinding process on the sintered body to form corner portions. The content of less than 0.01% by mass is not desirable because, although coloring is available, the coloring becomes poor in repetitive precision. Moreover, the content exceeding 10% by mass is not desirable as well because it causes a serious reduction in the sintering density, with the result that, upon various applications, the mechanical strength becomes insufficient to easily cause fractures and damages.

Here, the alumina and nickel spinel contained in the zirconia-based sintered body can be measured by carrying out, for example, a diffraction analysis on the zirconia-based sintered body by using Cu—Kα-ray (λ=1.54056 Å), and alumina can be identified by using data of No. 46-1212 of JCPDS-ICDD (Joint Committee for Powder Diffraction Studies-International Centre for Diffraction Data), while nickel spinel can be identified by using data of No. 10-339 of JCPDS-ICDD.

Here, the colored zirconia-based sintered body of the present invention is set to color difference (L*, a*, b*) in ranges of L*=50 to 90, a*=−14 to −9 and b*=−15 to −1. In the case when the color difference (L*, a*, b*) is out of these ranges, since the color that is totally composed of L* (lightness), a* (degree of green color) and b* (degree of blue color) fails to form "light blue color" referred to in the present invention, this state is not desirable.

Here, the "light blue color" as referred to in the present invention approximates to any one of color samples indicated by the sample numbers of (632C), (632C, 631C), (631C, 630C), (630C), (2975C, 629C), (304C) and (317C) in color samples, Formulaguide solid coated published by PANTONE, Inc., when the sintered body is visually inspected.

The following description will discuss a method for manufacturing a colored zirconia sintered body in accordance with the present invention.

(Production of Colorant)

First, at least one kind of nickel oxide material selected from nickel oxide and precursors thereof and at least one kind of alumina material selected from alumina and precursors thereof are pulverized and mixed with each other, and then fired to produce a colorant.

In addition to nickel oxide, a compound that can be converted to nickel oxide by a firing process (hereinafter, referred to as a nickel oxide precursor), for example, a carbonate, a halogenide, a hydroxide and an organic acid salt of nickel, can be used as the nickel oxide material.

In addition alumina, a compound that can be converted to alumina by a firing process (hereinafter, referred to as an alumina precursor), for example, a carbonate, a halogenide, a hydroxide and an organic acid salt of aluminum, can be used as the alumina material.

Next, the alumina material and nickel oxide material are prepared at a ratio of alumina/nickel oxide (mole fraction) of 0.5 or more, preferably, in a range from 1.5 to 2.5, more preferably, from 1.9 to 2.1, most preferably, to 2.0, and then pulverized and mixed with each other.

Here, the reason that the ratio of alumina/nickel oxide (mole fraction) is set to 0.5 or more is because the ratio makes it possible to generate an intermetallic compound ($NiO.Al_2O_3$) required for developing a superior light blue color. The mole fraction of less than 0.5 fails to provide a sufficient reacted state between alumina and nickel oxide for developing a desired color to undesirably make color development unstable. The reason for this has not been clarified; however, it is considered that alumina and nickel oxide become to easily solid-solute with each other, with the result that the above-mentioned intermetallic compound required for the color development of a superior light blue color is hardly generated. Moreover, the mole fraction exceeding 2.5 causes an increase in unreacted alumina to make it difficult to provide "light blue color" as mentioned in the present invention. Here, although not particularly limited, the pulverizing and mixing processes may be carried out, for example, through wet-pulverizing and mixing processes by the use of a ball mill.

Next, the resulting mixture is dried, and then fired. Although not particularly limited, the firing conditions are set to 600 to 1200° C., preferably, to 800 to 1000° C., for 1 to 5 hours. The temperature of less than 600° C. fails to sufficiently form the nickel oxide precursor and alumina precursor into oxides, resulting in the necessity of firing control for desalting. In contrast, the temperature exceeding 1200° C. makes the coagulation of the colorant stronger to be hardly pulverized into pieces. Here, with respect to the firing atmosphere, not particularly limited, as long as it is an oxidizing atmosphere, and, for example, those processes may be carried out in the air atmosphere.

Next, the colorant thus obtained is pulverized by using, for example, a speed mill so as to break the coagulated particles into pieces.

(Production of Zirconia-Based Sintered Body)

For example, yttria-partially-stabilized zirconia (YSZ) containing 2 to 3 mol % of yttria ($Y_2O_3$) is used as the zirconia containing a stabilizer.

The colorant is measured in its weight by using a scale and added so that it accounts for 0.01 to 10% by mass, preferably, 1 to 5% by mass, of the entire sintered body.

After the colorant has been added to the zirconia containing a stabilizer, alumina may be added thereto. The amount of addition of alumina is preferably set so that the content of alumina accounts for 0.1 to 50% by mass, preferably, 1 to 40% by mass, of the entire sintered body.

This mixture is put into a wet pulverizer such as a ball mill, and pulverized and mixed therein. Through these pulverizing and mixing processes, the grain size is set to 5 µm or less, preferably, to 1.5 µm or less, and the S.A. (specific surface area) is set to 1 $m^2/g$ or more, preferably, to 5 $m^2/g$ or more. The grain size exceeding 5 µm results in powder that is very poor in its sintering property. Moreover, the specific surface area of less than 1 $m^2/g$ also results in powder that is very poor in its sintering property.

After carrying out a wet-pulverizing process, the resulting slurry is filtered and dried, and then pulverized into pieces so that the resulting powder is used for a sintering material. In order to obtain a sintering material having high flowability, the slurry is preferably dried and granulated by using a spray drier. In this case, it is necessary for the moisture to be set to 5% by mass or less, more preferably, to 2% by mass or less. The moisture exceeding 5% by mass causes too much moisture, with the result that the sintering material is coagulated or the granulated body is deformed. Moreover, prior to the drying process by the spray drier, a binder for use in molding is preferably added to the slurry. Examples of the binder include polyvinyl alcohol (PVA), methylcellulose (MC), carboxyl methylcellulose (CMC), polyethylene oxide, acrylic emulsion and wax-based emulsion. By adding 10% by mass or less, preferably, 8% by mass or less of the binder to the slurry, the granulating property of the sintering material can be improved. The amount of the binder exceeding 10% by mass causes the granulated body after a drying process to become harder, resulting in serious degradation in the molding property, which will be discussed later.

The powder thus produced is grain-screened by using a sieve having 60 to 120 meshes, preferably, 80 to 100 meshes, in order to remove aggregated particles generated during the granulating process.

Next, molding and sintering processes are carried out by using the resulting powder as a sintering material so that a light-blue-colored zirconia-based sintered body is manufactured.

First, the sintering material is molded into a predetermined shape by using CIP or a powder-press molding method. With respect to the molding method, not limited to this method, an injection-molding method and a cast-molding method may be used depending on cases. Here, with respect to the pressure to be applied upon molding by using the CIP or powder-press molding method, although not particularly limited, it is preferably set to 49 to 147 MPa, so as to be molded by a generally-used molding machine.

In the case when a binder for use in molding is used, a degreasing process is preferably carried out. With respect to the degreasing conditions, although not particularly limited, the degreasing process is carried out until the mass reduction has been stabilized at a temperature capable of decomposing the binder, for example, in a range from 400 to 600° C. Desirably, the temperature-raising rate is preferably set to 15° C./h or less so as to prevent cracks (crazing) from occurring in the molded body during the degreasing process.

Next, the resulting molded body is fired at a temperature in a range from 1400 to 1600° C., preferably, from 1450 to 1550° C., in the air atmosphere for 1 to 5 hours, preferably, for 2 to 4 hours, so that a zirconia-based sintered body is obtained. The firing temperature of less than 1400° C. fails to sufficiently execute the sintering process to cause a reduction in the sintering density; in contrast, the firing temperature exceeding 1600° C. allows the sintering process to excessively progress to cause the crystal phase to become inhomogeneous, impairing the ceramics properties. Here, the firing time of less than one hour fails to sufficiently execute the sintering process to cause a serious reduction in the sintering density; in contrast, the firing time exceeding 5 hours allows the sintering process to excessively progress to cause the crystal phase to become inhomogeneous, impairing the ceramics properties. Not particularly limited, the atmosphere may be set to an inert gas atmosphere or a deoxidization atmosphere.

The resulting sintered body is subjected to a surface polishing process depending on its purpose so as to provide a glossy surface.

The following description will discuss examples so as to further clarify the features of the present invention. However, the present invention is not intended to be limited by the modes of these examples.

EXAMPLE 1

The following description will discuss examples of a method for producing a zirconia-based sintered body.

First, alumina (16.3 g) and nickel oxide (6.0 g) (mole fraction of alumina/nickel oxide=2) were put into a ball mill, and wet-pulverized and mixed. Powder taken out of the ball mill was dried, and then fired at 900° C. for two hours in the atmosphere, and pulverized by a speed mill so that colorant powder was produced.

Moreover, partially stabilized zirconia with 2 mol % yttria added thereto (HSY-2W, made by Daiichi Kigenso Kagaku Kogyo Co., Ltd.), alumina and the colorant were mixed at a mixing ratio shown in Table 1.

This mixture was put into a ball mill, and wet-pulverized.

Next, after powder for sintering material obtained by drying this slurry had been grain-adjusted through a sieve of 100 meshes, the resulting powder was temporarily molded by using a uniaxial pressure molding machine (HYDRAULIC PRESS, made by MARUSHICHI IRON WORKS Co., Ltd.), and this was then molded under a pressure of 98 MPa by using a CIP molding machine (Dr. CIP, made by Kobe Steel, Ltd.).

This molded body was sintered in the atmosphere at 1450° C. for 3 hours so that a light-blue-colored zirconia sintered body was manufactured. Next, the surface of the sintered body was polished so that a zirconia-based sintered body was obtained.

Moreover, the color difference and physical properties of the resulting zirconia-based sintered body were measured. Table 2 shows the results. Here, the measuring method as shown below was used.

TABLE 1

| | No. | | | | | |
|---|---|---|---|---|---|---|
| | 1 | 2 | 3 | 4 | 5 | 6 |
| Partially stabilized zirconia (g) | 99.7 | 99.0 | 95.0 | 90.0 | 87.5 | 75.0 |
| Alumina (g) | 0.3 | 1.0 | 5.0 | 10.0 | 12.5 | 25.0 |
| Colorant (g) | 2.3 | 2.3 | 2.3 | 2.3 | 2.3 | 2.3 |

TABLE 2

| | | No. | | | | | |
|---|---|---|---|---|---|---|---|
| | | 1 | 2 | 3 | 4 | 5 | 6 |
| Color difference | L* | 60.3 | 61.2 | 65.5 | 69.2 | 74.2 | 79.3 |
| | a* | −10.2 | −10.5 | −11.6 | −12.0 | −10.6 | −10.3 |
| | b* | −12.9 | −12.5 | −10.8 | −9.6 | −11.7 | −8.3 |

TABLE 2-continued

| | No. | | | | | |
|---|---|---|---|---|---|---|
| | 1 | 2 | 3 | 4 | 5 | 6 |
| Sintering density (g/cm³) | 6.00 | 5.97 | 5.85 | 5.68 | 5.64 | 5.32 |
| Vickers hardness (GPa) | 11.9 | 11.8 | 11.9 | 12.1 | 12.4 | 13.0 |
| Kic (MPa·m$^{0.5}$) | 10.2 | 8.8 | 10.2 | 10.1 | 8.4 | 6.2 |
| Color sample Nos. published by PANTONE, Inc. | 632C | 632C 631C | 631C 630C | 630C | 2975C 629C | 304C |

Table 2 clearly indicates that each of the zirconia-based sintered bodies of samples No. 1 to 6, obtained by using a mixture to which a nickel oxide material and an alumina material were added and mixed therein as a colorant, had color difference (L*, a*, b*) in ranges of L*=50 to 90, a*=−14 to −9 and b*=−15 to −1, and exhibited a light blue color corresponding to color samples Nos., with high levels in any of the sintered density, Vickers hardness and fracture toughness value.

EXAMPLE 2

Next, colorant powder was produced by changing the mixing ratio of alumina and nickel oxide, and a light-blue-colored zirconia sintered body was manufactured, in the same manner as in Example 1.

With respect to the colorant powder, alumina (16.3 g) and nickel oxide (11.9 g)(mole fraction of alumina/nickel oxide=1) were put into a ball mill, and wet-pulverized and mixed, and powder, taken out of the ball mill, was dried, and then fired at 1000 to 1600° C. for two hours in the atmosphere, and pulverized by a mill so that colorant powder was produced.

Next, partially stabilized zirconia with 2 mol % yttria added thereto (HSY-2W, made by Daiichi Kigenso Kagaku Kogyo Co., Ltd.), alumina and the colorant were mixed so as to be set at a predetermined sintered body composition shown in Table 3. This mixture was put into a ball mill, and wet-pulverized.

Next, after powder for sintering material obtained by drying this slurry had been grain-screened through a sieve of 100 meshes, the resulting powder was temporarily molded by using a uniaxial pressure molding machine (HYDRAULIC PRESS, made by MARUSHICHI IRON WORKS Co., Ltd.), and this was subjected to a main molding process under a pressure of 98 MPa by using a CIP molding machine (Dr. CIP, made by Kobe Steel, Ltd.).

This molded body was sintered in the atmosphere at 1450° C. for 3 hours so that a light-blue-colored zirconia-based sintered body was manufactured. Next, the surface of the sintered body was polished so that a light-blue-colored zirconia-based sintered body with a glossy surface was obtained. With respect to samples with sample numbers 1 to 34 having different mixing ratios of the partially stabilized zirconia, alumina and colorant, the color difference and physical properties were measured by using the following measuring methods.

The components contained in each of the sintered bodies were measured by an X-ray diffraction analysis so that it was confirmed that zirconia, alumina and nickel spinel were contained in the sintered body, and based upon the mixing rates of the materials, the mass % of each component was calculated. Table 3 shows the composition, color difference and physical properties of each of the samples.

(1) Color Difference

The color difference was measured by using a colorimeter (Model CR-221, made by Konica Minolta Holdings, Inc.) having a light-receiving unit with a spectral sensitivity of CIE1931 2° under an illumination optical system based upon a diffused lighting vertical light-receiving method (including regular reflection) in compliance with JIS Z 8722.

(2) Grain Size (μm)

The grain size was measured in accordance with JIS R 1629 (Determination of particle size distributions for fine ceramic raw powders by laser diffraction method).

(3) Specific Surface Area (m²/g)

The specific surface area was evaluated by using a BET one-point method defined in JIS R 1626 (Measuring methods for the specific surface area of fine ceramic powders by gas adsorption using the BET method).

(4) Sintering Density (g/cm³)

The sintering density was measured by a measuring method in accordance with JIS R 1634 (Test methods for density and apparent porosity of fine ceramics).

(5) Three-point Flexural Strength (MPa)

The three-point bending flexural strength was measured by a measuring method in accordance with JIS R 1601 (Testing method for flexural strength of fine ceramics).

(6) Vickers Hardness (GPa)

The Vickers hardness was measured by a measuring method in accordance with JIS R 1610 (Test methods for hardness of fine ceramics).

(7) $K_{IC}$ (MPa·m$^{0.5}$)

The fracture toughness value $K_{IC}$ was measured by an indenter press-injection method (IF method) defined in JIS R 1607 (Testing methods for fracture toughness of fine ceramics).

TABLE 3

| Sample number | Sintered body composition | | | Color difference | | | Sintering Density (g/cm³) | 3-point bending flexural strength (MPa) | Vickers hardness Hv (GPa) | Fracture toughness value (MPa√m) |
|---|---|---|---|---|---|---|---|---|---|---|
| | ZrO₂ (wt %) | Al₂O₃ (wt %) | NiAl₂O₄ (wt %) | L* | a* | b* | | | | |
| *1 | 99.995 | 0 | 0.005 | 86.1 | −1.13 | −0.2 | 6 | 1150 | 11.7 | 4.5 |
| *2 | 99.99 | 0 | 0.01 | 81.1 | −8.1 | −2.1 | 6 | 1100 | 11.6 | 4.4 |
| 3 | 99.49 | 0.5 | 0.01 | 66.4 | −9 | −4.4 | 6 | 1080 | 11.7 | 4.5 |
| 4 | 96.8 | 1 | 2.2 | 60.2 | −9.9 | −13 | 5.97 | 1050 | 11.9 | 4.7 |
| 5 | 89 | 1 | 10 | 50 | −14 | −15 | 5.7 | 1000 | 12 | 5 |
| *6 | 87 | 0 | 13 | 29.6 | −14.3 | −38.7 | 5.59 | 930 | 11.5 | 5.5 |
| 7 | 97.7 | 0.1 | 2.2 | 60 | −9.9 | −13 | 5.9 | 1020 | 11.9 | 7.5 |
| *8 | 98.6 | 0 | 1.4 | 54 | −9 | −17.6 | 6 | 1040 | 11.5 | 8.8 |
| 9 | 98.5 | 0.1 | 1.4 | 60 | −9.6 | −13.2 | 6 | 1010 | 11.9 | 8 |
| 10 | 98.1 | 0.5 | 1.4 | 60 | −9.6 | −12.9 | 6 | 1040 | 11.5 | 8.2 |
| 11 | 97.6 | 1 | 1.4 | 60.3 | −10 | −13 | 6 | 1050 | 11.8 | 9 |
| 12 | 97.5 | 1.1 | 1.4 | 60.3 | −10.2 | −12.9 | 6 | 1080 | 11.9 | 10.2 |
| 13 | 96.8 | 1.8 | 1.4 | 61.2 | −10.5 | −12.5 | 5.97 | 1040 | 11.8 | 8.8 |
| 14 | 92.8 | 5.8 | 1.4 | 65.5 | −11.6 | −10.8 | 5.85 | 1100 | 11.9 | 10.2 |
| 15 | 87.8 | 10.8 | 1.4 | 69.2 | −12 | −9.6 | 5.68 | 1130 | 12.1 | 10.1 |
| 16 | 85.5 | 13.1 | 1.4 | 74.2 | −10.6 | −11.7 | 5.64 | 1180 | 12.4 | 8.4 |
| 17 | 73.3 | 25.3 | 1.4 | 79.3 | −10.3 | −8.3 | 5.32 | 1240 | 13 | 6.2 |
| 18 | 65.1 | 33.5 | 1.4 | 81 | −10.5 | −7.7 | 5.08 | 1120 | 13.1 | 6.1 |
| 19 | 59.6 | 39 | 1.4 | 81 | −10.6 | −6.6 | 4.94 | 1070 | 13.5 | 6 |
| 20 | 58.6 | 40 | 1.4 | 81.5 | −10.6 | −6.6 | 4.94 | 1070 | 13.6 | 6 |
| 21 | 57.6 | 41 | 1.4 | 81.5 | −10.6 | −6.4 | 4.9 | 990 | 13.6 | 5.7 |
| 22 | 48.6 | 50 | 1.4 | 83.3 | −10.1 | −6 | 4.81 | 680 | 13.9 | 5.1 |
| *23 | 80 | 20 | 0 | 87 | −0.8 | −0.9 | 5.5 | 1250 | 12.5 | 7.6 |
| 24 | 79.995 | 20 | 0.005 | 86.2 | −9 | −1 | 5.5 | 1240 | 12.5 | 7.6 |
| 25 | 79.99 | 20 | 0.01 | 85 | −10.5 | −1.3 | 5.48 | 1240 | 12.6 | 7.5 |
| 26 | 79.9 | 20 | 0.1 | 83 | −11 | −3 | 5.45 | 1240 | 12.6 | 7.7 |
| 27 | 79 | 20 | 1 | 80 | −11.4 | −5.4 | 5.44 | 1240 | 12.6 | 7.8 |
| 28 | 78.6 | 20 | 1.4 | 77.3 | −12 | −8.2 | 5.4 | 1230 | 12.6 | 8 |
| 29 | 75.2 | 20 | 4.8 | 71 | −13 | −11 | 5.3 | 1180 | 12.8 | 7.2 |
| 30 | 71 | 20 | 9 | 57 | −13 | −11 | 5.25 | 1100 | 12.7 | 7.1 |
| 31 | 70 | 20 | 10 | 56.5 | −13.4 | −12 | 5.25 | 1060 | 12.9 | 7.1 |
| 32 | 69 | 20 | 11 | 55 | −13.5 | −12 | 5.14 | 990 | 12.2 | 5.5 |
| 33 | 68 | 20 | 12 | 55 | −13.9 | −12.6 | 5.1 | 910 | 12 | 5.5 |
| 34 | 65 | 20 | 15 | 52 | −14 | −13.6 | 5.1 | 760 | 12 | 5 |

*Out of the claims of the present invention

Moreover, the results of X-ray diffraction analysis carried out on the surface of sintered body of Sample No. 17 in Table 3 are shown in FIG. 1. The X-ray diffraction peak of alumina is indicated by ○, and the X-ray diffraction peak of nickel spinel is indicated by □.

In the Table, Sample Numbers 1, 2, 6, 8 and 23 with *marks attached thereto are samples, which are out of the claims of the present invention, and fail to provide light-blue colors. In contrast, the other samples, included in the claims of the present invention, provide light-blue colors and make it possible to achieve a high flexural strength of 600 MPa or more, which is sufficient strength for decorative members generally used.

As described above, the colored zirconia-based sintered body of the present invention, which has a superior color tone, is desirably used as a decorative member. Different from conventional zirconia having a dark bluish color, the zirconia-based sintered body has a faint light bluish color so that it becomes possible to widen the degree of freedom in designing. For example, upon forming a decorative member such as a watch band and pierces, it is possible not only to form the decorative member having a single color by using only the colored zirconia of the present invention, but also to form the decorative member having a complicated pattern by combining the colored zirconia with other members with different color tones. Moreover, it becomes possible to eliminate a conventional problem of decorative members made of metals and resins that the surface tends to be easily damaged to gradually impair the outer good appearance in use, and even when used as members that directly touch the skin, such as a watch band and pieces, no allergy problem is raised, which makes the colored zirconia-based sintered body of the present invention different from metals. Furthermore, it can be widely used as members that require decorative properties, such as cases for portable electronic apparatuses like cellular phones and electronic pens. In addition to those decorative members, it can also be used as members with a sharp edge on the tip, such as knives and tweezers, machining jigs and holding jigs for electronic parts, and sliding members, such as string guides.

The invention claimed is:

1. A colored zirconia-based sintered body having a light blue color, which is mainly composed of zirconia containing a stabilizer, comprising:

alumina ($Al_2O_3$) and nickel spinel ($NiAl_2O_4$), wherein color difference ($L^*, a^*, b^*$) is set so that $L^*$=50 to 90, $a^*$=−14 to −9 and $b^*$=−15 to −1.

2. The zirconia-based sintered body having a light blue color according to claim 1, wherein the content of the alumina is set in a range from 1 to 40% by mass, and the content of nickel spinel is set in a range from 0.01 to 10% by mass.

3. A decorative member made of the zirconia-based sintered body having a light blue color according to claim 1 or 2.

* * * * *